(12) United States Patent
Lapshin et al.

(10) Patent No.: US 9,852,122 B2
(45) Date of Patent: Dec. 26, 2017

(54) METHOD OF AUTOMATED ANALYSIS OF TEXT DOCUMENTS

(71) Applicant: OBSHCHESTVO S OGRANICHENNOY OTVETSTVENNOST'YU "TSENTR INNOVATSIY NATAL'I KASPERSKOY", Moscow (RU)

(72) Inventors: Vladimir Anatol'yevich Lapshin, Moscow (RU); Dmitriy Vsevolodovich Perov, Moscow (RU); Yekaterina Aleksandrovna Pshekhotskaya, Moscow (RU); Sergey S. Ryabov, Moscow (RU)

(73) Assignee: OBSHCHESTVO S OGRANICHENNOY OTVETSTVENNOST'YU "TSENTR INNOVATSIY NATAL'I KASPERSKOY", Moscow (RU)

(*) Notice: Subject to any disclaimer, the term of this patent is extended or adjusted under 35 U.S.C. 154(b) by 107 days.

(21) Appl. No.: 14/350,292

(22) PCT Filed: Nov. 16, 2012

(86) PCT No.: PCT/RU2012/000945
§ 371 (c)(1),
(2) Date: Apr. 7, 2014

(87) PCT Pub. No.: WO2013/073999
PCT Pub. Date: May 23, 2013

(65) Prior Publication Data
US 2014/0324416 A1    Oct. 30, 2014

(30) Foreign Application Priority Data
Nov. 18, 2011  (RU) .................... 2011146888

(51) Int. Cl.
*G06F 17/27* (2006.01)
*G06F 17/22* (2006.01)
(Continued)

(52) U.S. Cl.
CPC ........ *G06F 17/274* (2013.01); *G06F 17/2205* (2013.01); *G06F 17/2211* (2013.01);
(Continued)

(58) Field of Classification Search
CPC combination set(s) only.
See application file for complete search history.

(56) References Cited

U.S. PATENT DOCUMENTS 6,119,124 A *  9/2000  Broder ................ G06F 17/3071
7,392,174 B2 *  6/2008  Freeman ............. G06F 17/2715
                                                         704/1
(Continued)

*Primary Examiner* — Tammy Paige Goddard
*Assistant Examiner* — Keara Harris
(74) *Attorney, Agent, or Firm* — Bardmesser Law Group

(57) ABSTRACT

Automated analysis of text documents is used to scan text documents in order to find phrases or text fragments from other documents, or modifying the existing ones. A comparatively fast and universally applicable method finds phrases, sentences or even text fragments from other documents. The method includes: all electronic files containing model documents are converted to a given format; meaningful fragments, called "clauses", are extracted from them; the converted files containing model documents are stored in the database; each electronic file containing a document to be analyzed is converted to the given format; clauses extracted from analyzed documents are compared with clauses extracted from model documents; fractions of clauses from an analyzed document matching clauses from each model document are calculated; fractions found are then compared with a pre-set threshold value in order to find out whether there are text fragments from a model document in the analyzed one.

4 Claims, 5 Drawing Sheets

(51) Int. Cl.
*G06F 17/30* (2006.01)
*G06F 21/56* (2013.01)
*G06F 21/62* (2013.01)

(52) U.S. Cl.
CPC .... *G06F 17/2264* (2013.01); *G06F 17/30011* (2013.01); *G06F 17/30684* (2013.01); *G06F 21/563* (2013.01); *G06F 21/6209* (2013.01); *G06F 2221/2101* (2013.01)

(56) References Cited

U.S. PATENT DOCUMENTS

| | | | |
|---|---|---|---|
| 2010/0218080 A1* | 8/2010 | Matsuda | G06F 17/30675 715/209 |
| 2011/0055332 A1* | 3/2011 | Stein | G06F 17/30675 709/206 |

\* cited by examiner

Solution architecture
Last modified on 01/01/1601 4:00AM
Version: 0.01011601400
Pages: 3 Owner: John Doe
(project architect)
Approved: implementation project head
(...
(on _____ )
Customer (if submitted for customer's approval)
_____ (date _____ )
Contents
1. Document objective
1 2. List of abbreviations and terminology
1 3. Implementation logic chart
1 4. Equipment calculation for pilot project
4. Calculation procedure
5. Equipment calculation for industrial application
5.1. Calculation procedure
5.151. Processed traffic volume
5.2. Data storage parameters calculation
5.3. Equipment specifications
6.4. Back-up regulations
7. Monitoring
8. Modifications and customization
9. Purchased items register 1. Document objective
The document describes architecture of "System name as stated in objectives".
The inner objective of the document is to become effectively the MAIN and ONLY document describing all technical aspects pertaining to a specific implementation project in full detail. Bear in mind, that this document is INDISPENSABLE for any project.

FIG. 1 solutionarchitecturelastmodifiedon8634: version0120970
pages3ownerjohndoeprojectarchitect21785
)approvedimplementationprojecthead302132
oncustomerifsubmittedforcustomersapproval43461
datecontents149533
documentobjective1252863
listofabbreviationsandterminology1359156
implementationlogicchart1464787 Error!
equipmentcalculationforpilotproject73468
calculationprocedure802117 Bookmark not defined
equipmentcalculationforindustrialapplication91944
calculationprocedure15963642
processedtrafficvolume1510277733
datastorageparameterscalculation1511100574
equipmentspecifications16115768
backupregulations17122526
monitoring1891251152
modificationsandcustomization19130398
purchasededitemsregister1documentobjectivethedocument140190
describesarchitectureofsystemnameasstatedinobjectives149196
theinnerobjectiveofthedocumentistobecomeeffectively158763
themainandonlydocument165096
describingalltechnicalaspects174659
pertaining toaspecificimplementationprojectinfulldetail180591
bearinmindthatthisdocumentisindispensable189633
foranyproject192999

FIG. 2

METHOD OF AUTOMATED ANALYSIS OF TEXT DOCUMENTS

CROSS-REFERENCE TO RELATED APPLICATIONS

This application is a U.S. National Phase of PCT/RU2012/000945, filed on Nov. 16, 2012, which claims priority to RU 2011146888, filed on Nov. 18, 2011, which are both incorporated herein by reference in their entirety.

FIELD OF THE INVENTION

The present invention relates to automated analysis of text documents. It can be applied when developing new systems, which scan text documents in order to find, in those documents, phrases or text fragments from other documents, or modifying the existing ones.

DESCRIPTION OF THE RELATED ART

Today, many computer users face a serious problem of so called "data interception". Such a problem can surface if the documents passing through the internal network of a company are being tracked to find confidential data in them.

Currently, there are several known approaches to address this problem:

A conventional approach (Russian patent No. 2420800, issued Jun. 10, 2011) is to look for electronic documents with similar content, where rules of forming unique words are set, unique words and connections between them are weighted, a sematic net is built and is then compared to semantic nets of other documents. The problem of the conventional approach is that it is rather time consuming and applicable only in a limited area.

Another known approach (Russian patent No. 2007141666) is to collect, process and catalogue target data from non-organized sources, where lexical features of documents are compared with model data features. A similar approach (Japanese patent No. 2008-257444, issued Oct. 23, 2008) for similar files management has features of each file extracted due to the use of prescribed expressions and then compared to each other in order to calculate the coincidence value of the files. Both approaches also have a rather limited applicability.

Yet another approach (U.S. patent application No. 2010/0205525) classifies a text automatically by means of a computer system, where qualitative features of a word are defined, and then the classified text is scanned to calculate how often these features appear there. This approach also has a rather limited applicability.

Yet another approach is disclosed in U.S. Pat. No. 6,810,375, where the checked text is segmented into clauses consisting of a pre-set number of elements, and the clauses are then checked for coincidence with patterns, which have been made up according to pre-set rules. The checks shift along the element string by one or several positions at each step. The problem of this approach is that it is rather time consuming and has a rather limited applicability.

SUMMARY OF THE INVENTION

Thus, there is a need to expand the set of technical means by implementing a comparatively fast and universally applicable method to find phrases, sentences or even text fragments from other documents, which overcomes the problems and disadvantages of the related art.

To achieve this objective, the present invention uses automated analysis of text documents, where:
- all electronic files containing model (template) documents are converted to a given format;
- meaningful fragments, called "clauses", are extracted from them;
- the converted files containing model documents are stored in a database;
- each electronic file containing a document to be analyzed is converted to the given format;
- clauses extracted from analyzed documents are compared with clauses extracted from model documents;
- fractions of clauses from an analyzed document matching clauses from each model document are calculated;
- found fractions are then compared with a pre-set threshold value in order to determine whether there are text fragments from a model document in the analyzed one.

A distinctive feature of the present approach is that the file containing a text document is first converted into a binary stream, where each byte corresponds to meaningful characters or punctuation marks of the natural language used in the given document.

Another feature of the present approach is that the electronic file containing a text document is converted to the given format, where:
- all meaningful characters and punctuation marks are extracted beforehand from each natural language in use;
- clauses are extracted from the text of the converted document;
- all meaningless characters are deleted from the clauses;
- all remaining meaningful characters in each clause are replaced with their lowercase counterparts, which results in a so called "shingle";
- a hash-value for each shingle is calculated;
- an inverted index of the document is formed from pairs including the calculated hash-value for a shingle and the position of that shingle in the document, which results in a sorted list of the pairs with the ID of the given document.

Yet another feature of the present approach is that the binary stream is converted to the given format, whereas:
- all meaningful characters and punctuation marks are extracted beforehand from each natural language in use;
- clauses are extracted from the text of the converted document;
- all meaningless characters are deleted from the clauses;
- all remaining meaningful characters in each clause are replaced with their lowercase counterparts, which results in a so called "shingle";
- a hash-value for each shingle is calculated;
- some shingles with their hash-values are randomly selected from the pre-set interval within each binary document;
- an inverted index of the document is formed from pairs consisting of the calculated hash-value for each selected shingle and the position of that shingle in the document, which results in a sorted list of said pairs with the ID of the given document.

Yet another feature of the present approach is that the fraction of matching fragments (i.e., the coefficient of coincidence) is calculated based on following the equation:

$$r(D_d, D_e) = \frac{|D_e| \cap |D_d|}{|D_e|},$$

where $D_d$ is the model document, $D_e$ is the analyzed document, |D| is the number of shingles found in the document D, and $r(D_d, D_e)$ is the coefficient of coincidence.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 shows an exemplary text document undergoing the analysis described in the method.

FIG. 2 shows a sequence of shingles extracted from the document shown on FIG. 1.

DETAILED DESCRIPTION OF THE PREFERRED EMBODIMENTS

Figure 3:
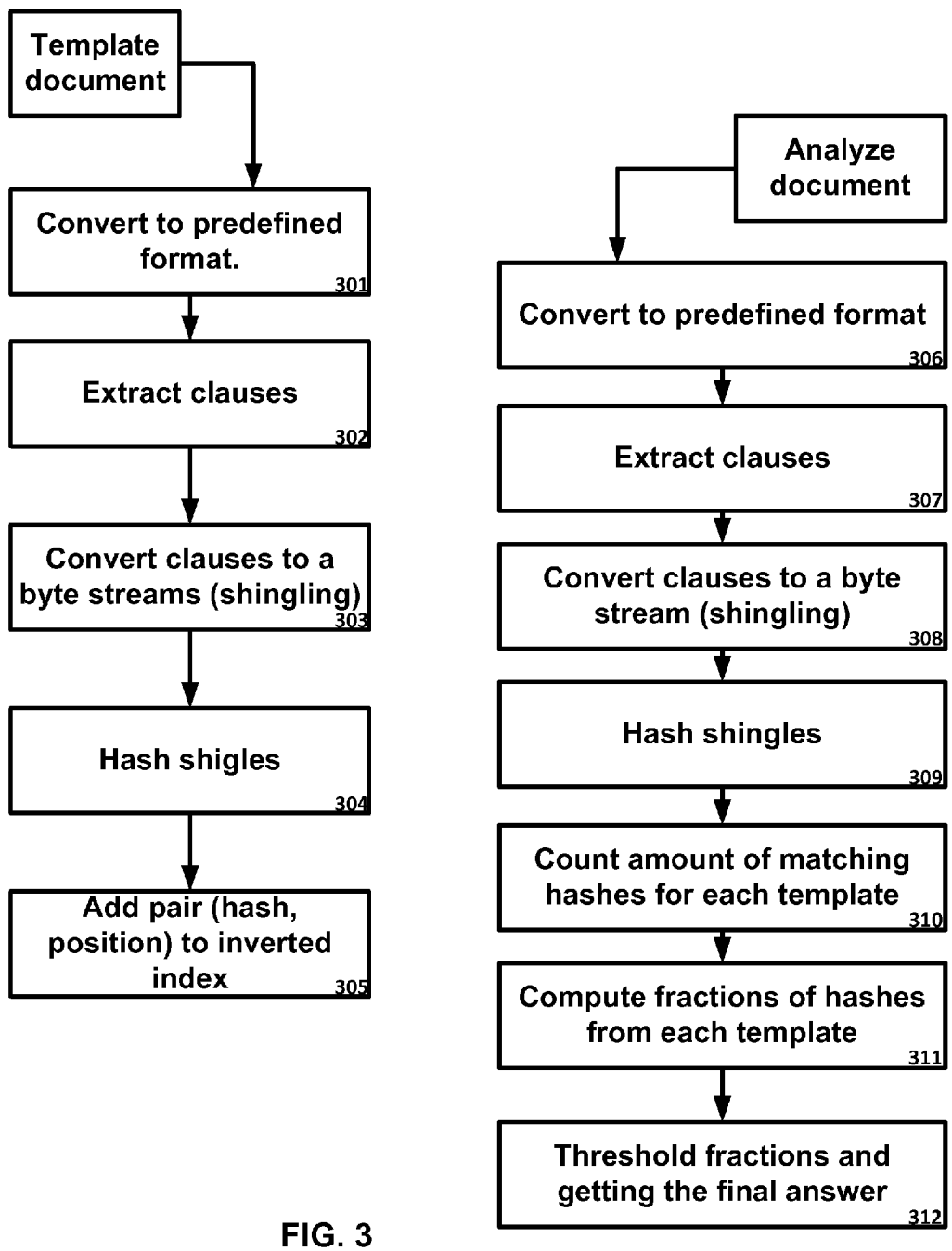
FIG. 3 shows an exemplary flow chart of the method.

The present invention can be implemented in any computing system, e.g. desktop computer, server, etc. The embodiment also needs the relevant database, where electronic files containing text documents are stored.

The present method of automated analysis of text documents conducts so called "fingerprint detection" (i.e., copyright analysis) to detect coincidences between binary and/or text documents and "model" documents stored in the database (library). Binary documents are regarded as byte streams (binary threads), thus the value of coincidence for this type of documents is the factor of analyzed document existing in the model document (from 0 to 1). When text documents are analyzed, the fragments, which are common for both analyzed and model documents, are found, and their positions in the model document are detected. The algorithm is accurate to within 80 meaningful symbols (alphabet characters and numbers). According to safety regulations, texts themselves of model documents are not stored anywhere, thus preventing them to be read without authorization.

Generally, the electronic file containing the text document is first converted into a binary thread, where each byte corresponds to meaningful characters or punctuation marks of the natural language used in the given document. This stage is optional, since, for instance, the analyzed document, which already is a byte stream, doesn't need to undergo this procedure of conversion.

But then, according to the present method, the binary thread is converted into a specialized format for further processing. The preferred way to convert the binary thread into the given format is as follows.

Since analyzed text documents can be written in various natural languages, each language undergoes the process of extraction of all its meaningful symbols and punctuation marks. For instance, in Japanese, the "。" symbol is used instead of a full stop; and in Spanish the " ¿ " symbol can be put at the beginning of a sentence. All such meaningful characters and punctuation marks of the given language are attributed to specific bytes, which make up the basis for further processing of the text in the given natural language. This operation is executed by experts in automatic mode.

When a document written in a specific natural language is provided to be processed according to the present method, it undergoes extraction of so called "clauses", i.e., meaningful fragments. This operation is also executed by experts in automatic mode. All the rest can be done fully automatically, without operator's control.

All meaningless symbols (e.g., spaces) are removed from each extracted clause, the rest is converted into lowercase (i.e., capital letters are transformed into small ones), and this results in a so called "shingle", or a byte string. A pre-set hash-function is used to calculate hash-values of each shingle.

Some shingles with their hash-values are randomly selected from the pre-set interval within each binary document. If the processed document is already a binary thread, the selection stage is skipped. Then the inverted index of the document is formed from pairs consisting of the calculated hash-value for each selected shingle and the position of that shingle in the document, which results in a sorted list of said pairs with the ID of the given document. In this description, the position of a shingle is a reference to the beginning of the shingle, calculated from its end. That is why the document index is called "inverted".

FIGS. 1-2 illustrate an example of converting a document into such format. FIG. 1 contains an exemplary text fragment, and FIG. 2 contains a sequence of shingles extracted from this text.

The given example of conversion into the given format is put here just as an illustration of the method. Other formats can also be used to convert clauses into shingles. E.g., all clauses can be of the same length, or shingles can have some special features of characters highlighted (uppercase symbols, spaces, etc.).

The conversion algorithm described above (or any other possible algorithm) is applied to so called "model documents". These documents can be either pre-uploaded, or new, i.e. given the "model" status during the analysis. Information about these model documents (i.e. their inverted indexes) is stored in the database.

When the electronic file containing any analyzed document is provided, it is converted into the same given format. Then, it is scanned to find whether there are clauses extracted from the analyzed document matching clauses extracted from model documents. This can be checked by comparing shingles of the analyzed document with shingles of model documents, or using any other known approach (e.g., see U.S. Pat. No. 6,810,375).

When looking for coincidences, the system calculates the fraction of clauses from the analyzed document, which match corresponding clauses from each model document. The fraction of matching fragments (i.e. the coefficient of coincidence) is calculated, for instance, following the equation:

$$r(D_d, D_e) = \frac{|D_e| \cap |D_d|}{|D_e|},$$

where $D_d$ is the model document, $D_e$ is the analyzed document, $|D|$ is the quantity of shingles found in the document D, $r(D_d, D_e)$ is the coefficient of coincidence. Experts should be aware of other methods to calculate this value (e.g. see U.S. patent application No. 2010/0205525).

After the number of coincidences is calculated, fractions of coincidences are compared with a pre-set threshold value in order to find out whether there are text fragments from a model document in the analyzed one. Thus, a statistical value of the analyzed document is got, i.e. relevancy rate to model documents from the database.

If needed, the position of the clause matching a clause from a model document can be found using inverted index.

It is also worth mentioning, that model documents themselves are stored in the database in the form of said inverted indexes, thus preventing them to be read without authorization.

FIG. 3 shows an exemplary flow chart of the method. As shown in FIG. 3, in step 301, a model document goes into converting to the predefined format. All meaningful characters from document are extracted and converted to unique code points. All meaningless characters are discarded. In step 302, the sequence of meaningful characters are broken into clauses. Clauses represent meaningful fragments from the document. They should be not too short and not too long. Usually, breaking up is done at the punctuation marks. If the sentence runs for too long, the clause could be broken at the word boundaries.

In step 303, clauses are converted to shingles by dropping punctuation marks, spaces, and other code points that does not affect semantics of clause. In step 304, each shingle is being hashed. The hash to use does not necessarily have to be cryptographically secure, however is should be cryptographically strong to some extent. This allows protections of the model document in case the hashed shingle database is itself not secure. In that case, it would be computational infeasible to restore documents given only shingle hashes.

In step 305, hashes are added to the inverted index. This index could be stored in the database, as well as in a file on a disk. After this operation, either the database tables or the file should be in a state that enables to retrieve document ID and position of the clause in the document given the hash of the shingle.

In step 306, the analyzed document is converted in the predefined format. All meaningful characters from document are extracted and converted to unique code points. All meaningless characters are discarded. This step is identical to 301. In step 307, the sequence of meaningful characters are broken into clauses. Clauses represent meaningful fragments from the document. They should be not too short and not too long. Usually, breaking done at the punctuation marks. If the sentence runs for too long the clause could be broken at the word boundaries. This step is identical to 302. In step 308, clauses are converted to shingles by dropping punctuation marks, spaces, and other code points that does not affect semantics of clause. This step is identical to 303.

In step 309, each shingle is being hashed, as described in step 304. In step 310, the hashes from each model document are searched for a match with hashes of the analyzed document. For each document, we count amount of hashes that are identical. This value is $|D_e| \cap |D_d|$.

In step 311, the fraction of hashes from each model document is being computed. The amount $|D_e|$ of total hash amount is extracted from inverted index and for each model document the following fraction is computed:

$$r(D_d, D_e) = \frac{|D_e| \cap |D_d|}{|D_e|}$$

In step 312, for each model document, there is a threshold $r_e$. If the fraction $$r(D_d, D_e) = \frac{|D_e| \cap |D_d|}{|D_e|} > r_e$$

model document is considered detected. All positions of shingles are extracted from inverted index and added to the result.

Figure 4:
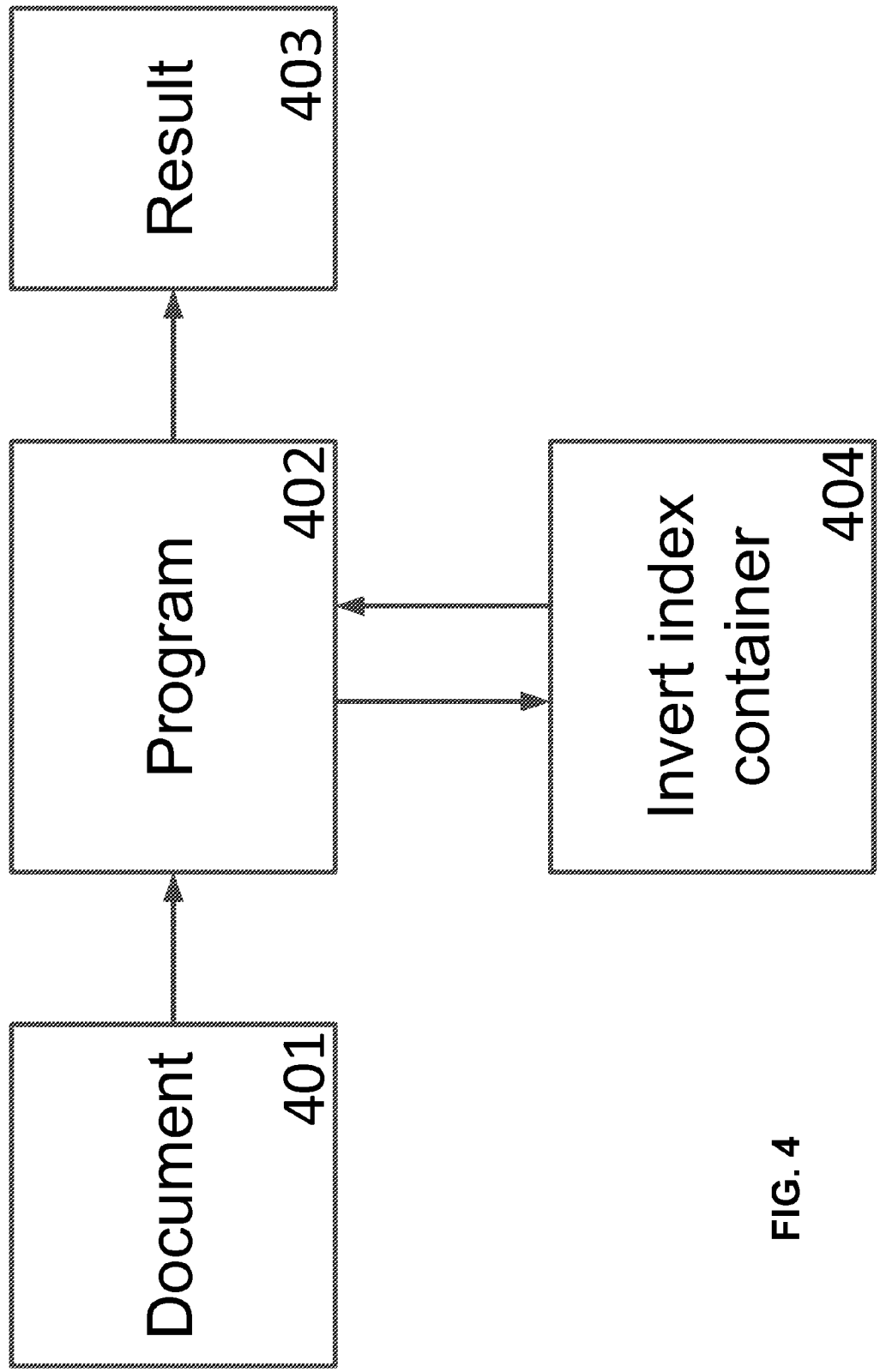
FIG. 4 shows an exemplary system block diagram that can be used to implement the invention.

FIG. 4 shows an exemplary system block diagram that can be used to implement the invention. In FIG. 4, 401 is the document being analyzed or added as a model. 402 is a software program that implements the algorithm of adding model documents or analyzing document. It could be a service on the network as well as standalone program on the user machine. 403 are identifiers of documents that were detected and positions of text in the etalon document that were found in analyzed document. This might also include fraction $r(D_d, D_e)$ as relevance to the etalon. 404 is the database, file or another storage of inverted index that is being updated at the time etalon is added and queried whenever document is being analyzed.

Therefore, the present method of automated analysis of text expands the set of technical means, allowing finding phrases, sentences or even text fragments from other documents comparatively fast, thus overcoming disadvantages of conventional approaches, namely, their limited applicability.

Figure 5:
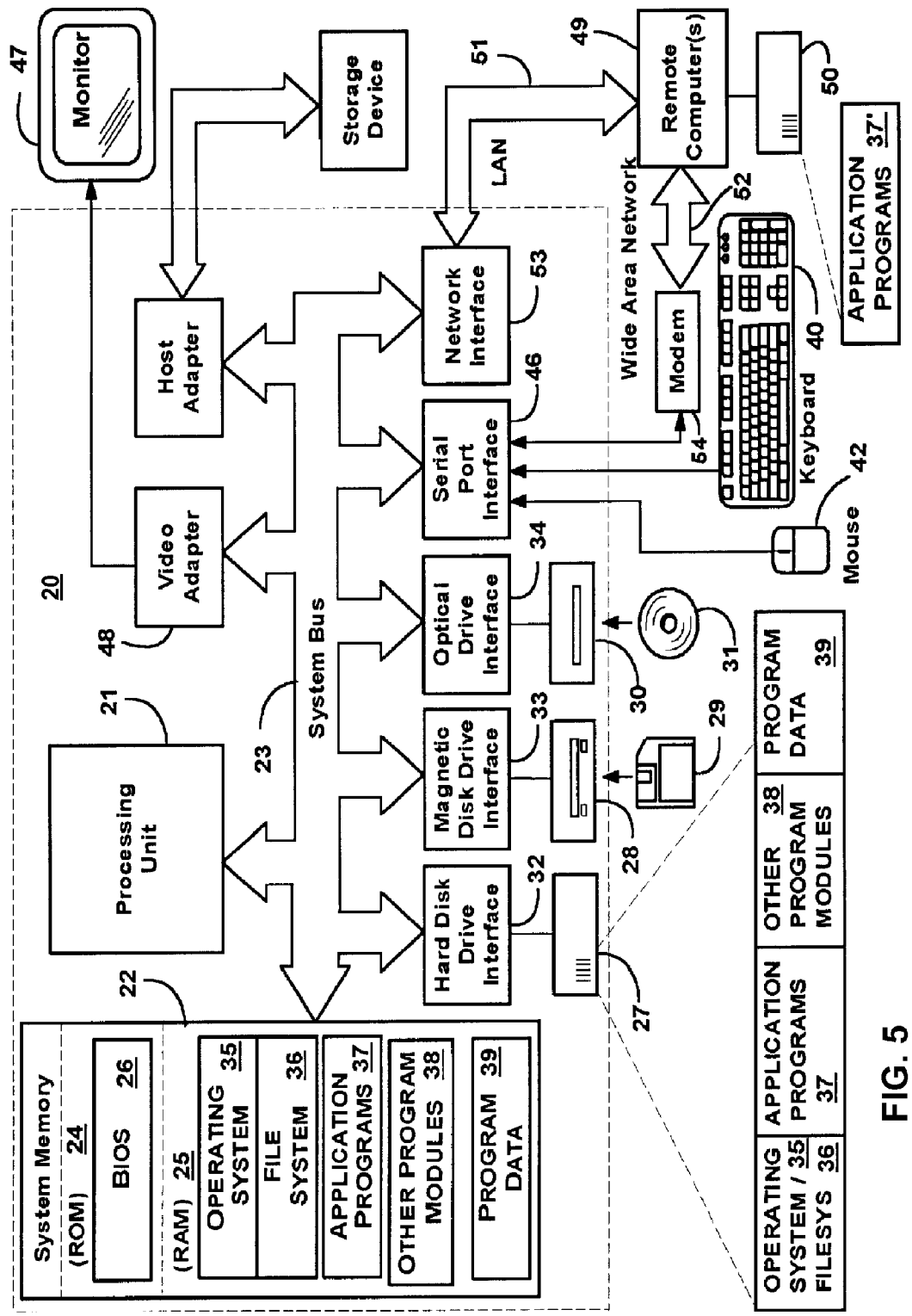
FIG. 5 shows an exemplary computer system that may be used to implement the invention.

With reference to FIG. 5, an exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method of automated analysis of text documents, the method comprising:
converting electronic files containing model documents to a Unicode Transformation Format (UTF) format that is capable of representing all characters in all languages that the text documents are written;
extracting clauses representing meaningful fragments from the model documents;
storing the converted files containing model documents in a database;
converting each electronic file containing a document to be analyzed into the Unicode Transformation Format (UTF) format;
identifying a natural language of the document to be analyzed; extracting clauses from the document to be analyzed;
removing spaces and punctuation from the clauses to generate corresponding shingles;
generating hash values of the shingles;
comparing the hash values for the clauses extracted from the analyzed documents with hash values for clauses extracted from the model documents;
calculating fractions of clauses from one of the analyzed documents matching clauses from each model document according to $$r(D_d, D_e) = \frac{|D_e| \cap |D_d|}{|D_e|},$$

where $D_d$ is the model document, $D_e$, is the analyzed document, $|D|$ is a number of shingles found in the analyzed document, and $r(D_d, D_e)$ is a coefficient of coincidence;
comparing the fractions with a pre-set threshold value to identify if the analyzed document contains text fragments from at least one of the model documents.

2. The method of claim 1, wherein the file containing a text document first is converted into a binary stream, wherein each byte corresponds to meaningful characters or punctuation marks of the natural language used in the text document.

3. The method of claim 2, wherein the file containing the text document is converted to the UTF format, and further comprising:
extracting clauses from the text of the converted document;
replacing all remaining meaningful characters in each clause with their lowercase counterparts, before generating the corresponding shingle;
forming an inverted index of the document from pairs of the calculated hash-value for a shingle and a position of that shingle in the document, to thereby generate a sorted list of the pairs with an ID of a corresponding document.

4. The method of claim 2, wherein the binary stream is converted to the UTF format, and further comprising:
extracting clauses from the text of the converted document;
replacing all remaining meaningful characters in each clause with their lowercase counterparts, before generating the corresponding shingle;
randomly selecting some shingles with their hash-values from a pre-set interval within each binary stream;
forming an inverted index of the document from pairs of the calculated hash-value for a shingle and a position of that shingle in the document, to thereby generate a sorted list of the pairs with an ID of a corresponding document.

* * * * *